(12) United States Patent
Crignon et al.

(10) Patent No.: US 10,909,960 B2
(45) Date of Patent: Feb. 2, 2021

(54) METHOD FOR PRODUCING A PROTECTIVE SOUND PANEL FOR A MOTOR VEHICLE

(71) Applicant: TREVES PRODUCTS, SERVICES & INNOVATION, Paris (FR)

(72) Inventors: Guillaume Crignon, Sillery (FR); Christophe Capron, Epoye (FR); Dominique Lemaire, Villiers devant le Thour (FR)

(73) Assignee: TREVES PRODUCTS, SERVICES & INNOVATION, Paris (FR)

( * ) Notice: Subject to any disclaimer, the term of this patent is extended or adjusted under 35 U.S.C. 154(b) by 14 days.

(21) Appl. No.: 16/091,739

(22) PCT Filed: Apr. 3, 2017

(86) PCT No.: PCT/FR2017/050772
§ 371 (c)(1),
(2) Date: Oct. 5, 2018

(87) PCT Pub. No.: WO2017/174913
PCT Pub. Date: Oct. 12, 2017

(65) Prior Publication Data
US 2019/0096381 A1     Mar. 28, 2019

(30) Foreign Application Priority Data
Apr. 5, 2016  (FR) ..................... 16 52992

(51) Int. Cl.
*G10K 11/168* (2006.01)
*B32B 5/20* (2006.01)
(Continued)

(52) U.S. Cl.
CPC ............ *G10K 11/168* (2013.01); *B29C 44/12* (2013.01); *B29C 51/004* (2013.01);
(Continued)

(58) Field of Classification Search
CPC ... G10K 11/168; B29C 44/12; B29C 44/1209; B29C 51/004; B29C 67/246;
(Continued)

(56) References Cited

FOREIGN PATENT DOCUMENTS

| EP | 2549474 A1 | 1/2013 |
| EP | 2792550 A2 | 10/2014 |
| FR | 2823357 A1 | 10/2002 |

OTHER PUBLICATIONS

EP2549474 translation (Year: 2013).*
(Continued)

*Primary Examiner* — Stella K Yi
(74) *Attorney, Agent, or Firm* — Murtha Cullina LLP

(57) ABSTRACT

The invention relates to a method for producing a protective sound panel for a motor vehicle. The method involves producing a complex including a fibre-based porous back layer, an intermediate layer of shredded recycled material, and a porous front layer, placing the complex in a thermoforming mould to produce a three-dimensional shell, placing the shell in an RIM mould and injecting a foam precursor mixture in order to form a sealed acoustic insulation barrier the binder being incorporated into the front layer. The front layer having a mass per unit area of between 500 and 2000 g/m2, and at least one lightly compressed, high-absorption region with a thickness of between 4 and 10 mm, the minimum total percentage of the lightly compressed region being 40%.

8 Claims, 1 Drawing Sheet

(51) Int. Cl.
| | |
|---|---|
| B60R 13/08 | (2006.01) |
| B32B 5/14 | (2006.01) |
| B32B 3/00 | (2006.01) |
| B32B 5/16 | (2006.01) |
| B32B 5/10 | (2006.01) |
| B32B 5/30 | (2006.01) |
| B32B 5/02 | (2006.01) |
| B32B 7/12 | (2006.01) |
| B32B 5/26 | (2006.01) |
| B32B 5/08 | (2006.01) |
| B32B 3/26 | (2006.01) |
| B32B 5/24 | (2006.01) |
| B32B 7/08 | (2019.01) |
| B29C 44/12 | (2006.01) |
| B29C 51/00 | (2006.01) |
| B29C 67/24 | (2006.01) |
| B32B 27/06 | (2006.01) |
| B32B 27/08 | (2006.01) |
| B32B 27/30 | (2006.01) |

(52) U.S. Cl.
CPC ............. *B29C 67/246* (2013.01); *B32B 3/00* (2013.01); *B32B 3/263* (2013.01); *B32B 3/266* (2013.01); *B32B 5/022* (2013.01); *B32B 5/08* (2013.01); *B32B 5/10* (2013.01); *B32B 5/142* (2013.01); *B32B 5/145* (2013.01); *B32B 5/16* (2013.01); *B32B 5/20* (2013.01); *B32B 5/245* (2013.01); *B32B 5/26* (2013.01); *B32B 5/30* (2013.01); *B32B 7/08* (2013.01); *B32B 7/12* (2013.01); *B32B 27/065* (2013.01); *B32B 27/08* (2013.01); *B32B 27/30* (2013.01); *B60R 13/08* (2013.01); *B32B 2260/021* (2013.01); *B32B 2260/046* (2013.01); *B32B 2262/0276* (2013.01); *B32B 2262/12* (2013.01); *B32B 2264/0228* (2013.01); *B32B 2266/0278* (2013.01); *B32B 2307/102* (2013.01); *B32B 2307/718* (2013.01); *B32B 2307/7265* (2013.01); *B32B 2307/732* (2013.01); *B32B 2605/00* (2013.01); *B32B 2605/08* (2013.01)

(58) Field of Classification Search
CPC ............ B29C 2045/165; B29C 67/248; B29C 2049/227; B32B 3/00; B32B 3/263; B32B 3/266; B32B 5/022; B32B 5/08; B32B 5/10; B32B 5/142; B32B 5/145; B32B 5/16; B32B 5/20; B32B 5/245; B32B 5/26; B32B 5/30; B32B 7/08; B32B 7/12; B32B 27/065; B32B 27/068; B32B 27/30; B32B 13/08; B32B 2272/00
See application file for complete search history.

(56) References Cited

OTHER PUBLICATIONS

EP2792550 translation (Year: 2014).*
Anonymous, "Textile non-tisse—Wikipedia" Jul. 8, 2015.
International Search Report issued in corresponding application No. PCT/FR2017/050772, dated Jun. 7, 2017.

* cited by examiner

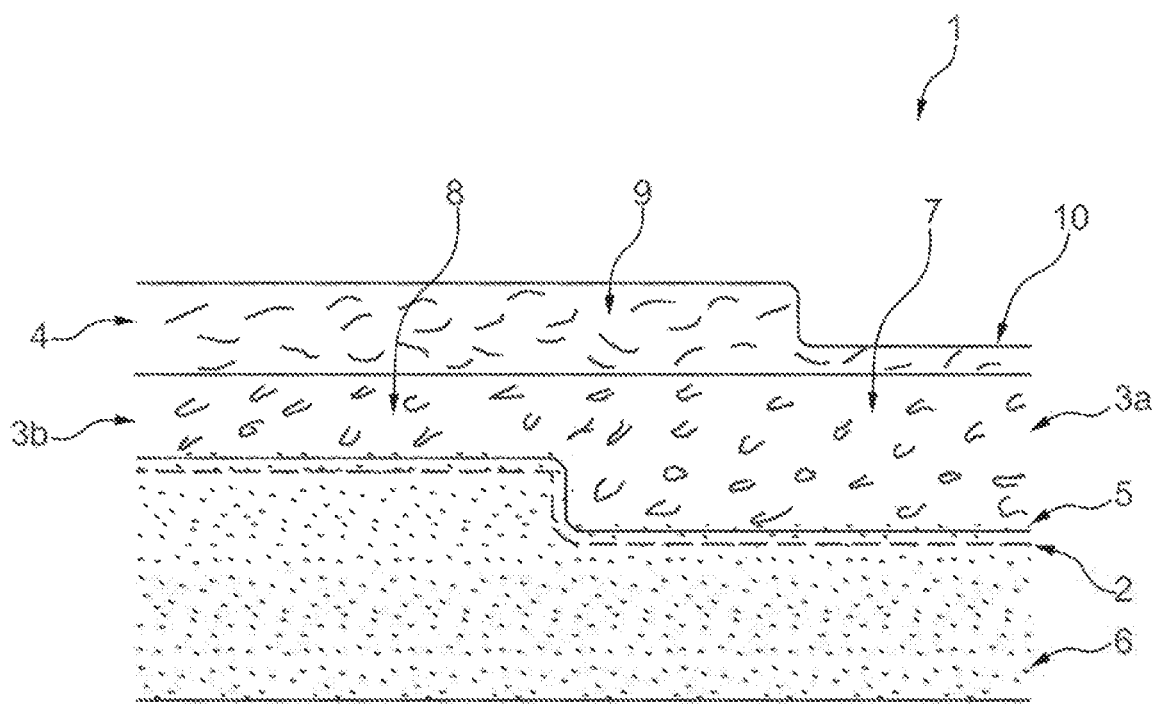

METHOD FOR PRODUCING A PROTECTIVE SOUND PANEL FOR A MOTOR VEHICLE

CROSS-REFERENCE TO RELATED APPLICATION

This application claims the benefit of International application number PCT/FR2017/050772, filed Apr. 3, 2017 and French patent application number 1652992, filed on Apr. 5, 2016, the entire contents of which are incorporated herein by reference.

TECHNICAL FIELD

The invention relates to a method for producing a protective sound panel for a motor vehicle and a panel obtained by such a method.

BACKGROUND

It is known, in particular from document EP-2 549 474, to implement a method for producing a protective sound panel for a motor vehicle, the method comprising the following steps:
producing a complex comprising:
  a reverse porous layer, in particular non-woven based,
  an intermediate sound absorption layer comprising a flexible foam flake-based porous matrix, in particular coming from recycling, connected to one another by a binding agent within which are dispersed particles of dense material, in particular coming from recycling, of density greater than that of the matrix,
  and a face layer, in porous material cloth form, for protecting the intermediate layer, the cloth being in particular non-woven based,
heating the complex to melting point of the binding agent,
arranging the complex once heated in a thermoforming mould so as to produce a three-dimensional shell,
after cooling, demoulding the shell,
arranging the shell in a reaction injection moulding (RIM) mould defining a moulding cavity, the reverse layer being turned towards the cavity, a space being left vacant between the reverse layer and a wall of the cavity,
injecting into the space a precursory foam mixture, in particular made of polyurethane, elastically compressible, such that the foam overmoulds the reverse layer and the intermediate layer by partially penetrating it so as to form a sealed sound insulation barrier,
after expansion of the foam in the space, demoulding the panel obtained.

Such an embodiment enables to obtain a panel having both absorption and sound insulation properties.

The absorption is achieved through the intermediate layer, this because of the porosity of the matrix.

Regarding insulation, it is generated by the sealed barrier, combined with the mass given to the intermediate layer by the particles of dense material, the assembly being arranged on a foam layer resulting from the RIM moulding, so as to achieve a "mass-spring" type insulation.

However, it can be sought to produce an intermediate layer from a composition, other than that defined above, in particular in view of recycling waste of varied types.

In addition, it can thus prove to be that the intermediate layer has a reduced porosity, even very low, which does not enable to give it the expected effectiveness in terms of sound absorption.

SUMMARY OF THE INVENTION

The invention aims to overcome this disadvantage.

To this end, and according to a first aspect, the invention proposes a method for producing a protective sound panel for a motor vehicle, the method comprising the following steps:
producing a complex comprising a fibre-based reverse porous layer, a recycled material shred-based intermediate layer and a porous face layer, the complex comprising a thermoplastic binding agent,
heating the complex to melting point of the binding agent,
arranging the complex once heated in a thermoforming mould so as to produce a three-dimensional shell,
after cooling, demoulding the shell,
arranging the shell in a reaction injection moulding (RIM) mould defining a moulding cavity, the reverse layer being turned towards the cavity, a space being left vacant between the reverse layer and a wall of the cavity,
injecting into the space a precursory foam mixture, in particular made of polyurethane, elastically compressible, such that the foam overmoulds the reverse layer by penetrating it at least partially, and by possibly penetrating the intermediate layer, so as to form a sealed sound insulation barrier,
after expansion of the foam in the space, so as to form a spring layer, demoulding the panel obtained, the binding agent being incorporated to the face layer, the face layer having on the panel a surface mass of between 500 and 2000 g/m$^2$, the thermoforming of the complex being achieved such that the face layer further has:
at least one slightly compressed zone of high absorption, so as to give the face layer sound absorption properties, the minimum total percentage of the slightly compressed zone being 40% of the surface area of the face layer, the zone having a thickness of between 4 and 10 mm, the thickness being measured according to the standard NF EN ISO 5084 with a presser foot of surface area 2000+/−20 mm$^2$ under a pressure of 1+/−0.1 kPa,
possibly at least one highly compressed zone of low absorption, the zone having a thickness of between 1 and 3 mm, the thickness being measured according to the standard NF EN ISO 5084 with a presser foot of surface area 2000+/−20 mm$^2$ under a pressure of 1+/−0.1 kPa.

The possible existence of at least one zone of low absorption is linked to the fact that it can arise that the face layer can be locally compressed, the compression of the layer being done, for example, in the periphery thereof, in the periphery of orifices provided to enable the passage of members, or again to enable the housing of the panel in the zones where the receiving space of the panel is reduced.

The face layer can, for certain specific embodiments, have no highly compressed zone, the whole surface area thereof thus forming a high absorption zone.

With the proposed arrangement, the recycled material shred enables to bring some mass onto the sealing barrier in view of achieving sound insulation according to a "mass-spring" principle.

Furthermore, the type of shred can be varied at leisure, the latter could have a low porosity, since the face layer, through the characteristics thereof, achieves the expected sound absorption.

Highly varied materials can thus be recycled.

According to a second aspect, the invention proposes a panel obtained by such a method.

Other particularities and advantages of the invention will appear in the following description, made in reference to the attached FIGURE which is a schematic cross-section view of a panel obtained by the method of the invention according to an embodiment.

BRIEF DESCRIPTION OF THE DRAWINGS

FIG. 1 is a cross sectional view of the sound panel.

DETAILED DESCRIPTION

In reference to the figures, a method for producing a protective sound panel 1 for a motor vehicle is described, the method comprising the following steps:
  producing a complex comprising a fibre-based reverse porous layer 2, a recycled material shred-based intermediate layer 3a, 3b and a porous face layer 4, the complex comprising a thermoplastic binding agent,
  heating the complex to melting point of the binding agent,
  arranging the complex once heated in a thermoforming mould so as to produce a three-dimensional shell,
  after cooling, demoulding the shell,
  arranging the shell in a reaction injection moulding (RIM) mould defining a moulding cavity, the reverse layer being turned towards the cavity, a space being left vacant between the reverse layer and a wall of the cavity,
  injecting into the space a precursory foam mixture, in particular made of polyurethane, elastically compressible, such that the foam overmoulds the reverse layer by penetrating it at least partially, and by possibly penetrating the intermediate layer, so as to form a sealed sound insulation barrier,
  after expansion of the foam in the space, so as to form a spring layer 6, demoulding the panel obtained, the binding agent being incorporated to the face layer, the face layer having on the panel a surface mass of between 500 and 2000 g/m², the thermoforming of the complex being achieved such that the face layer further has:
    at least one slightly compressed zone of high absorption 9, so as to give the face layer sound absorption properties, the minimum total percentage of the slightly compressed zone being 40% of the surface area of the face layer, the zone having a thickness of between 4 and 10 mm, the thickness being measured according to the standard NF EN ISO 5084 with a presser foot of surface area 2000+/−20 mm² under a pressure of 1+/−0.1 kPa,
    possibly—and actually according to the embodiment represented—at least one highly compressed zone of low absorption 10, the zone having a thickness of between 1 and 3 mm, the thickness being measured according to the standard NF EN ISO 5084 with a presser foot of surface area 2000+/−20 mm² under a pressure of 1+/−0.1 kPa.

As specified above, the face layer can, for certain specific and non-represented embodiments, have no highly compressed zone, the whole surface area thereof thus forming a high absorption zone.

According to an embodiment, the face layer 4 has, on the panel 1, a resistance to the passage of air, measured according to the standard ISO 9053/method B through alternative air flow:
  of between 300 and 2000 N·s·m⁻³ in a high absorption zone 9,
  of between 1500 and 6000 N·s·m⁻³ in a low absorption zone 10.

According to an embodiment, the face layer 4 is made of structure fibres, for example made of polyester, connected to one another by binding fibres, of "bi-component" type, comprising a core, for example made of polyester, provided with a meltable sleeve, for example made of co-polyester.

According to a variant of an embodiment, the binding agent is polypropylene-based.

According to another embodiment, the face layer 4 is made of flakes of an elastically compressible foam linked to one another by binding fibres such as defined above.

In this case, it can be provided to cover the face layer 4 with a protective layer, not represented, of non-woven type of low surface mass, for example less than 100 g/m².

According to an embodiment, the intermediate layer 3a, 3b has a surface mass of between 500 and 1500 g/m².

According to an embodiment, the intermediate layer 3a, 3b is made of:
  thermoplastic elastomer charged with a mineral powder, and/or fibres,
  and/or polyvinyl butyral (PVB), in particular coming from used windscreens.

According to an embodiment, the intermediate layer 3a, 3b is implemented by sprinkling the recycled material shred.

According to an embodiment, the reverse layer 2 has a surface mass of between 50 and 200 g/m².

According to an embodiment, the reverse layer 2 has a thickness of less than 2 mm.

According to an embodiment, the reverse layer 2 is a non-woven layer.

According to an embodiment, the layers 2, 3a, 3b, 4 of the complex are connected to one another by needling-punching and/or by gluing through melting, at least partially, of the intermediate layer 3a, 3b.

According to the embodiment represented, the complex is produced so as to have, in the front view:
  a heavy zone 7, of high sound protection, comprising a first recycled material shred-based intermediate layer 3a, arranged between the face 4 and reverse 2 layers,
  at least one light zone 8 of low sound protection, the light zone:
  comprising, according to the embodiment represented, a second recycled material shred-based intermediate layer 3b, arranged between the face and reverse layers, the second layer having a surface mass lower than that of the first layer—here, because of a lesser thickness—so as to form a light zone of first type,
  or, according to a non-represented embodiment, having no intermediate layer, the face and reverse layers being arranged in contact with one another, so as to form a light zone of second type.

According to an embodiment, the foam penetrates the shell over a fraction less than 25% of the thickness thereof.

Finally, a panel 1 produced by the above-defined method is described, the panel comprising:
  a three-dimensional shell comprising a fibre-based porous reverse layer 2, a recycled material shred-based intermediate layer 3a, 3b and a porous face layer 4, the face layer comprising a thermoplastic binding agent, the face layer having, over the panel, a surface mass of between 500 and 2000 g/m², the face layer further having:
- at least one slightly compressed zone of high absorption 9, so as to give the face layer sound absorption properties, the minimum total percentage of the slightly compressed zone being 40% of the surface area of the face layer, the zone having a thickness of between 4 and 10 mm, the thickness being measured according to the standard NF EN ISO 5084 with a presser foot of surface area 2000+/−20 mm² under a pressure of 1+/−0.1 kPa,
- possibly at least one highly compressed zone of low absorption 10, the zone having a thickness of between 1 and 3 mm, the thickness being measured according to the standard NF EN ISO 5084 with a presser foot of surface area 2000+/−20 mm² under a pressure of 1+/−0.1 kPa,
- a foam spring layer 6, in particular made of polyurethane, elastically compressible, overmoulding the reverse layer by penetrating it at least partially, and by possibly penetrating the intermediate layer, so as to form a sealed sound insulation barrier 5.

What is claimed is:

1. A method for producing a protective sound panel for a motor vehicle, the method comprising the following steps:
   producing a complex comprising a fibre-based reverse porous layer, a recycled material shred-based intermediate layer and a porous face layer, the complex comprising a thermoplastic binding agent,
   heating the complex to melting point of the thermoplastic binding agent,
   arranging the complex once heated in a thermoforming mould so as to produce a three-dimensional shell,
   after cooling, demoulding the three-dimensional shell,
   arranging the three-dimensional shell in a reaction injection moulding (RIM) mould defining a moulding cavity, the fibre-based reverse porous layer being turned towards the moulding cavity, a space being left vacant between the fibre-based reverse porous layer and a wall of the moulding cavity,
   injecting into the space a precursory foam mixture of polyurethane, elastically compressible, such that the foam overmoulds the fibre-based reverse porous layer by penetrating it at least partially, and by penetrating the recycled material shred-based intermediate layer, so as to form a sealed sound insulation barrier,
   after expansion of the foam in the space, so as to form a spring layer, demoulding the panel obtained, wherein the thermoplastic binding agent is incorporated to the porous face layer, the porous face layer having on the panel a surface mass of between 500 and 2000 g/m2, the thermoforming of the complex being achieved such that the porous face layer further has:
   at least one slightly compressed zone of high absorption, so as to give the porous face layer sound absorption properties, the minimum total percentage of the slightly compressed zone of high absorption being at least 40% of the surface area of the porous face layer, the at least one slightly compressed zone of high absorption having a thickness of between 4 and 10 mm, the at least one slightly compressed zone of high absorption thickness being measured according to the textile thickness measurement standard NF EN ISO 5084 with a presser foot of surface area 2000+/−20 mm2 under a pressure of 1+/−0.1 kPa,
   at least one highly compressed zone of low absorption, the at least one highly compressed zone of low absorption zone having a thickness of between 1 and 3 mm, the at least one highly compressed zone of low absorption thickness being measured according to the textile thickness measurement standard NF EN ISO 5084 with a presser foot of surface area 2000+/−20 mm2 under a pressure of 1+/−0.1 kPa. wherein the complex is produced so as to have, in a front view:
   a heavy zone, of high sound protection, comprising a first recycled material shred-based intermediate layer, arranged between the porous face layer and the fibre-based reverse porous layer, and
   at least one light zone of low sound protection, the at least one light zone of low sound protection:
   comprising a second recycled material shred-based intermediate layer, arranged between the porous face layer and the fibre-based reverse porous layer, the second recycled material shred-based intermediate layer, having a surface mass lower than that of the first recycled material shred-based intermediate layer, to form a light zone of low sound protection of first type,
   or, having no intermediate layer, the porous face layer and the fibre-based reverse porous layer being arranged in contact with one another, to form a light zone of low sound protection of second type.

2. The method according to claim 1, wherein the porous face layer has over the panel a resistance to air passage, measured according to the standard ISO 9053/method B by alternative air flow:
   of between 300 and 2000 N·s·m$^{-3}$ in a high absorption zone,
   of between 1500 and 6000 N·s·m$^{-3}$ in a low absorption zone.

3. The method according to claim 1, wherein the porous face layer is made of structure fibres connected to one another by binding fibres comprising a core provided with a meltable sleeve or by a binding agent made of polypropylene.

4. The method according to claim 1, wherein the porous face layer is made of flakes of an elastically compressible foam linked to one another by binding fibres comprising a core provided with a meltable sleeve.

5. The method according to claim 1, wherein the intermediate layer has a surface mass of between 500 and 1500 g/m².

6. The method according to claim 1, wherein the intermediate layer is made of:
   thermoplastic elastomer charged with a mineral powder, and/or fibres,
   and/or polyvinyl butyral (PVB).

7. The method according to claim 1, wherein the fibre-based reverse porous layer and the porous face layer of the complex are connected to one another by needling-punching and/or by gluing through melting, at least partially, of the intermediate layer.

8. The method according to claim 1, wherein the foam penetrates the three-dimensional shell over a fraction less than 25% of the thickness thereof.

* * * * *